US00RE47105E

(19) United States
(12) Reissued Patent
Maidla et al.

(10) Patent Number: US RE47,105 E
(45) **Date of Reissued Patent: *Oct. 30, 2018**

(54) METHOD AND APPARATUS FOR DIRECTIONAL DRILLING

(71) Applicant: Schlumberger Technology Corporation, Sugar Land, TX (US)

(72) Inventors: Eric E. Maidla, Sugar Land, TX (US); Marc Haci, Houston, TX (US)

(73) Assignee: Schlumberger Technology Corporation, Sugar Land, TX (US)

( * ) Notice: This patent is subject to a terminal disclaimer.

(21) Appl. No.: 15/225,163

(22) Filed: Aug. 1, 2016

Related U.S. Patent Documents

Reissue of:
(64) Patent No.: 6,802,378
Issued: Oct. 12, 2004
Appl. No.: 10/325,639
Filed: Dec. 19, 2002

U.S. Applications:
(63) Continuation of application No. 14/279,669, filed on May 16, 2014, now Pat. No. Re. 46,090, which is a continuation of application No. 13/854,058, filed on Mar. 30, 2013, now Pat. No. Re. 45,898, which is an application for the reissue of Pat. No. 6,802,378.

(51) Int. Cl.
*E21B 44/00* (2006.01)
*E21B 7/06* (2006.01)
*E21B 44/04* (2006.01)

(52) U.S. Cl.
CPC ..... *E21B 44/00* (2013.01); *E21B 7/068* (2013.01); *E21B 44/04* (2013.01)

(58) Field of Classification Search
CPC . E21B 44/00; E21B 44/04; E21B 7/04; E21B 7/068
USPC ..... 175/24, 26, 40, 45, 61
See application file for complete search history.

(56) References Cited

U.S. PATENT DOCUMENTS

| | | | | |
|---|---|---|---|---|
| 5,465,799 | A * | 11/1995 | Ho | 175/61 |
| 6,050,348 | A * | 4/2000 | Richarson et al. | 175/26 |
| 9,145,768 | B2 * | 9/2015 | Normore | E21B 44/00 |
| RE45,898 | E * | 2/2016 | Maidla | E21B 7/068 |
| RE46,090 | E * | 8/2016 | Maidla | E21B 7/068 |
| 2002/0104685 | A1 * | 8/2002 | Pinckard et al. | 175/61 |

OTHER PUBLICATIONS

Jean Michel Genevois, Jean Boulet, and Christophe Simon, Gyrostab Project : The Missing Link Azimuth and inclination mastered with new principles for standard rotary BHAs, Society of Petroleum Engineers, SPE/IADC 79915, Feb. 19, 2003.
Canrig Drilling Technology, Ltd., sales brochure for Directional Steering Control System (DSCS).

* cited by examiner

*Primary Examiner* — Kenneth J Whittington
(74) *Attorney, Agent, or Firm* — Richard A. Fagin

(57) ABSTRACT

A method of and system for directional drilling reduces the friction between the drill string and the well bore. A downhole drilling motor is connected to the surface by a drill string. The drilling motor is oriented at a selected tool face angle. The drill string is rotated at said surface location in a first direction until a first torque magnitude without changing the tool face angle. The drill string is then rotated in the opposite direction until a second torque magnitude is reached, again without changing the tool face angle. The drill string is rocked back and forth between the first and second torque magnitudes.

5 Claims, 2 Drawing Sheets

METHOD AND APPARATUS FOR DIRECTIONAL DRILLING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*More than one reissue application has been filed for the reissue of U.S. Pat. No. 6,802,378. The present reissue application is a continuation reissue of U.S. application Ser. No. 14/279,669 filed on May 16, 2014, now U.S. Pat. No. RE46,090, which is a continuation reissue application of U.S. application Ser. No. 13/854,058, filed Mar. 30, 2013, now U.S. Pat. No. RE45,898. Each of these applications is a reissue application of U.S. application Ser. No. 10/325,639, filed Dec. 19, 2002, now U.S. Pat. No. 6,802,378.*

FIELD OF THE INVENTION

The present invention relates generally to the field of oil and gas well drilling. More particularly, the present invention relates to a method and system for directional drilling in which the drill string is rotated back and forth between selected surface measured torque magnitudes without changing the tool face angle, thereby to reduce friction between the drill string and the well bore.

BACKGROUND OF THE INVENTION

It is very expensive to drill bore holes in the earth such as those made in connection with oil and gas wells. Oil and gas bearing formations are typically located thousands of feet below the surface of the earth. Accordingly, thousands of feet of rock must be drilled through in order to reach the producing formations. Additionally, many wells are drilled directionally, wherein the target formations may be spaced laterally thousands of feet from the well's surface location. Thus, in directional drilling, not only must the depth but also the lateral distance of rock must be penetrated.

The cost of drilling a well is primarily time dependent. Accordingly, the faster the desired penetration location, both in terms of depth and lateral location, is achieved, the lower the cost in completing While many operations are required to drill and complete a well, perhaps the most important is the actual drilling of the bore hole. In order to achieve the optimum time of completion of a well, it is necessary to drill at the optimum rate of penetration and to drill in the minimum practical distance to the target location. Rate of penetration depends on many factors, but a primary factor is weight on bit.

Directional drilling is typically performed using a bent sub mud motor drilling tool that is connected to the surface by a drill string. During sliding drilling, the drill string is not rotated; rather, the drilling fluid circulated through the drill string cause the bit of the mud motor drilling tool to rotate. The direction of drilling is determined by the azimuth or face angle of the drilling bit. Face angle information is measured downhole by a steering tool. Face angle information is typically conveyed from the steering tool to the surface using relatively low bandwidth mud pulse signaling. The driller attempts to maintain the proper face angle by applying torque or drill string angle corrections to the drill string.

Several problems in directional drilling are caused by the fact that a substantial length of the drill string is in frictional contact with and supported by the borehole. Since the drill string is not rotating, it is difficult to overcome the friction. The difficulty in overcoming the friction makes it difficult for the driller to apply sufficient weight to the bit to achieve an optimal rate of penetration. The drill string exhibits stick/slip friction such that when a sufficient amount of weight is applied to overcome the friction, the drill the weight on bit tends to overshoot the optimum magnitude.

Additionally, the reactive torque that would be transmitted from the bit to the surface through drill string, if the hole were straight, is absorbed by the friction between the drill string and the borehole. Thus, during drilling, there is substantially no reactive torque at the surface. Moreover, when the driller applies drill string angle corrections at the surface in an attempt to correct the bit face angle, a substantial amount of the angular change is absorbed by friction without changing the face angle in stick/slip fashion. When enough angular correction is applied to overcome the friction, the face angle may overshoot its target, thereby requiring the driller to apply a reverse angular correction.

It is known that the frictional engagement between the drill string and the borehole can be reduced by rocking the drill string back and forth between a first angle and a second angle. By rocking the string, the stick/slip friction is reduced, thereby making it easier for the driller to control the weight on bit and make appropriate face angle corrections.

SUMMARY OF THE INVENTION

The present invention provides a method and system for directional drilling that reduces the friction between the drill string and the well bore. According to the present invention, a downhole drilling motor is connected to the surface by a drill string. The drilling motor is oriented at a selected tool face angle. The drill string is rotated at the surface location in a first direction until a first torque magnitude is reached, without changing the tool face angle. The drill string is then rotated in the opposite direction until a second torque magnitude is reached, again without changing the tool face angle. The drill string is rocked back and forth between the first and second torque magnitudes.

DESCRIPTION OF THE PREFERRED EMBODIMENT

Figure 1:
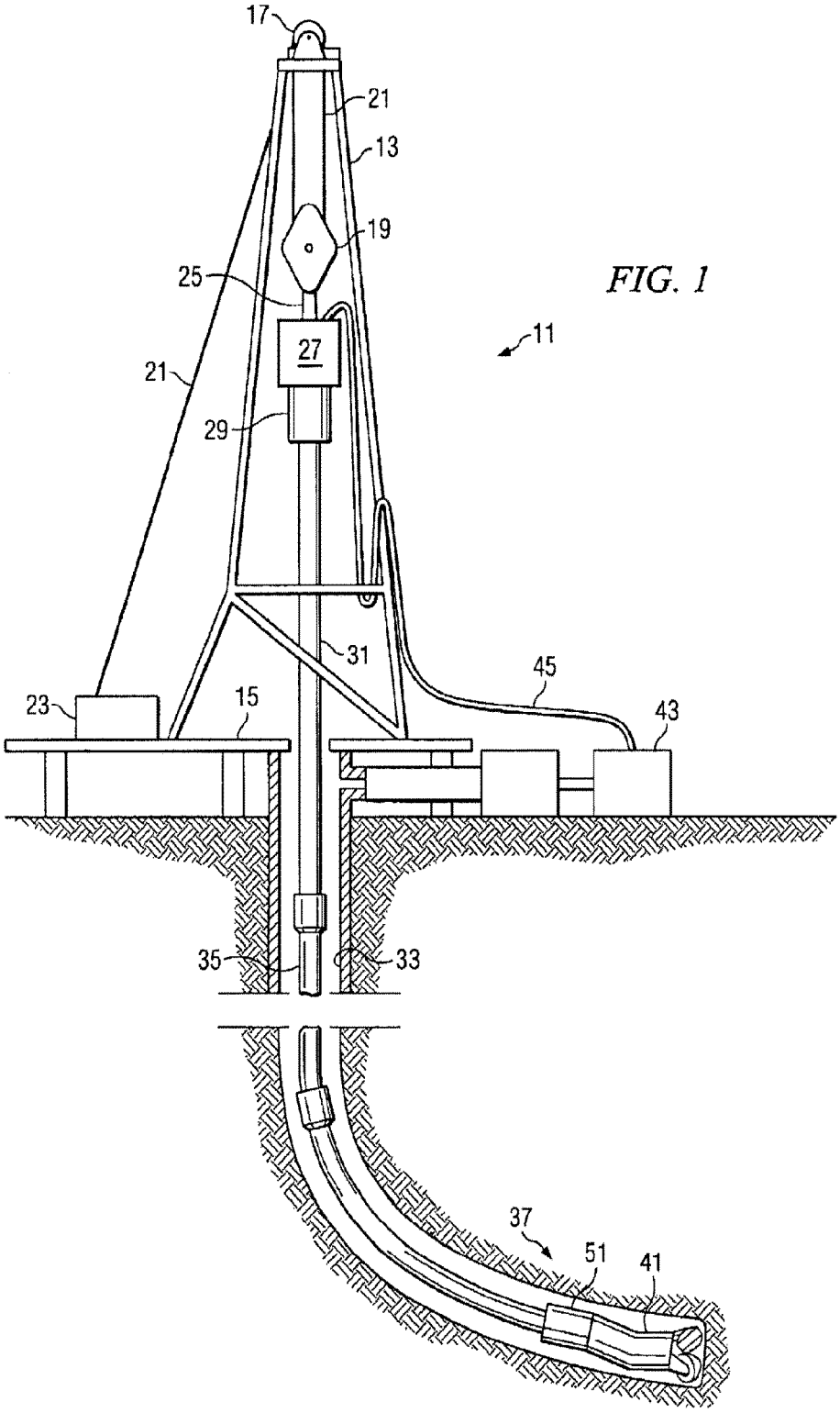
FIG. 1 is a pictorial view of a directional drilling system.

Referring now to the drawings and first to FIG. 1, a drilling rig is designated generally by the numeral 11. Rig 11 in FIG. 1 is depicted as a land rig. However, as will be apparent to those skilled in the art, the method and system of the present invention will find equal application to non-land rigs, such as jack-up rigs, semisubmersibles, drill ships, and the like.

Rig 11 includes a derrick 13 that is supported on the ground above a rig floor 15. Rig 11 includes lifting gear, which includes a crown block 17 mounted to derrick 13 and a traveling block 19. Crown block 17 and traveling block 19 are interconnected by a cable 21 that is driven by draw works 23 to control the upward and downward movement of traveling block 19. Traveling block 19 carries a hook 25 from which is suspended a top drive 27. Top drive 27 supports a drill string, designated generally by the numeral 31, in a well bore 33. Top drive 27 can be operated to rotate drill string 31 in either direction.

According to an embodiment of the present invention, drill string 31 is coupled to top drive 27 through an instrumented sub 29. As will be discussed in detail hereinafter, instrumented top sub 29 includes sensors that provide drill string torque information according to the present invention.

Drill string 31 includes a plurality of interconnected sections of drill pipe 35 a bottom hole assembly (BHA) 37, which includes stabilizers, drill collars, and a suite of measurement while drilling (MWD) instruments including a steering tool 51. As will be explained in detail hereinafter, steering tool 51 provides bit face angle information according to the present invention.

A bent sub mud motor drilling tool 41 is connected to the bottom of BHA 37. As is well known to those skilled in the art, the face angle of the bit of drilling tool 41 used to control azimuth and pitch during sliding directional drilling. Drilling fluid is delivered to drill string 31 by mud pumps 43 through a mud hose 45. During rotary drilling, drill string 31 is rotated within bore hole 33 by top drive 27. As is well known to those skilled in the art, top drive 27 is slidingly mounted on parallel vertically extending rails (not shown) to resist rotation as torque is applied to drill string 31. During sliding drilling, drill string 31 is held in place by top drive 27 while the bit is rotated by mud motor 41, which is supplied with drilling fluid by mud pumps 43. The driller can operate top drive 27 to change the face angle of the bit of drilling tool 41. Although a top drive rig is illustrated, those skilled in the art will recognize that the present invention may also be used in connection with systems in which a rotary table and kelly are used to apply torque to the drill string The cuttings produced as the bit drills into the earth are carried out of bore hole 33 by drilling mud supplied by mud pumps 43.

Figure 2:
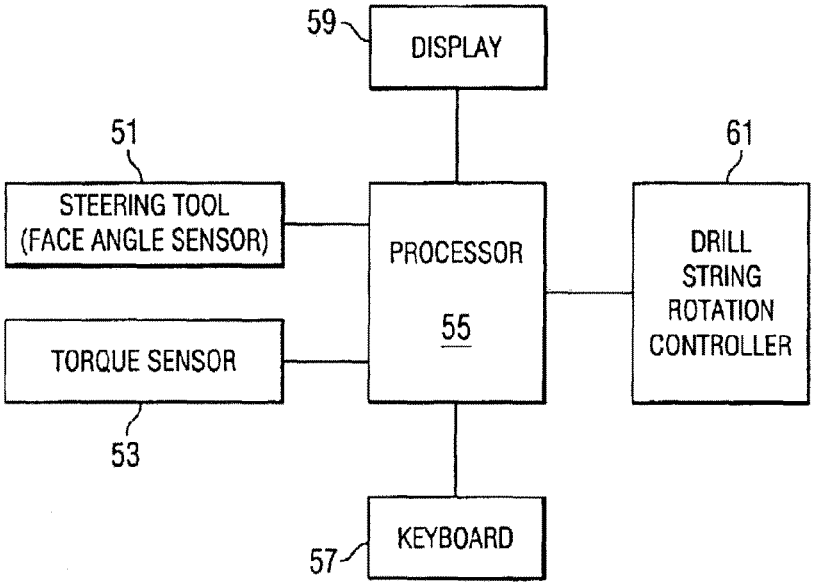
FIG. 2 is a block diagram of a directional driller control system according to the present invention.

Referring now to FIG. 2, there is shown a block diagram of a preferred system of the present invention. The system of the present invention includes a steering tool 51, which produces a signal indicative of drill bit face angle. Typically, steering tool 51 uses mud pulse telemetry to send signals to a surface receiver (not shown), which outputs a digital face angle signal. However, because of the limited bandwidth of mud pulse telemetry, the face angle signal is produced at a rate of once every several seconds, rather than at the preferred five times per second sampling rate. For example, the sampling rate for the face angle signal may be about once every twenty seconds.

The system of the present invention also includes a drill string torque sensor 53, which provides a measure of the torque applied to the drill string at the surface. The drill string torque sensor may implemented as a strain gage in instrumented top sub 29 (illustrated in FIG. 1). The torque sensor 53 may also be implemented as a current measurement device for an electric rotary table or top drive motor, or as pressure sensor for an hydraulically operated top drive. The drill string torque sensor 53 provides a signal that may be sampled at the preferred sampling rate of five times per second.

In FIG. 2, the outputs of sensors 51 and 53 are received at a processor 55. Processor 55 is programmed according to the present invention to process data received from sensors 51-53. Processor 55 receives user input from user input devices, such as a keyboard 57. Other user input devices such as touch screens, keypads, and the like may also be used. Processor 55 provides visual output to a display 59. Processor 55 also provides output to a drill string rotation controller 61 that operates the top drive (27 in FIG. 1) or rotary table to rotate the drill string according to the present invention.

According to the present invention, drilling, tool 41 is oriented at tool face angle selected to achieve a desired trajectory. As drilling tool 41 is advanced into the hole, processor 55 operates drill string rotation controller 61 to rotate drill string 35 in a first direction while monitoring drill string torque with torque sensor 53 and tool face angle with steering tool 51. As long as the tool face angle remains constant, rotation controller 61 continues to rotate drill string 35 in the first direction. When the steering tool 51 senses a change in tool face angle, processor 55 notes the torque magnitude measured by torque sensor 53 and actuates drill string rotation controller 61 to reverse the direction of rotation of drill string 31. Torque is a vector having a magnitude and a direction. When torque sensor 53 senses that the magnitude of the drill string torque has reached the magnitude measured in the first direction, processor 55 actuates rotation controller 61 reverse the direction of rotation of drill string 31. As drilling progresses, processor 55 continues to monitor drill torque with torque sensor 53 and actuates rotation controller 61 to rotate drill string 31 back and forth between the first torque magnitude and the second torque magnitude. The back and forth rotation reduces or eliminates stick/slip friction between the drill string and the well bore, thereby making it easier for the driller to control weight on bit and tool face angle.

Alternatively, the torque magnitude may be preselected by the system operator. When the torque detected by the torque sensor 53 reaches the preselected value, the processor 55 sends a signal to the controller 61 to reverse direction of rotation. The rotation in the reverse direction continues until the preselected torque value is reached again. In some embodiments, the preselected torque value is determined by calculating an expected rotational friction between the drill string (35 in FIG. 1) and the wellbore wall, such that the entire drill string above a selected point is rotated. The selected point is preferably a position along the drill string at which reactive torque from the motor 41 is stopped by friction between the drill string and the wellbore wall. The selected point may be calculated using "torque and drag" simulation computer programs well known in the art. Such programs calculate axial force and frictional/lateral force at each position along the drill string for any selected wellbore trajectory. One such program is sold under the trade name WELLPLAN by Landmark Graphics Corp., Houston, Tex.

While the invention has been disclosed with respect to a limited number of embodiments, those of ordinary skill in the art, having the benefit of this disclosure, will readily appreciate that other embodiments may be devised which do not depart from the scope of the invention. Accordingly, the scope of the invention is intended to be limited only by the attached claims.

What is claimed is:

[1. A method of drilling a well, which comprises:

(a) orienting a downhole drilling motor at a selected face angle, said drilling motor being connected by a drill string to a surface drilling location;

(b) rotating said drill string at said surface location in a first direction until a first measured torque magnitude is reached at said surface location; and then, (c) rotating said drill string in the direction opposite said first direction until a second measured torque magnitude is reached at said surface location.]

[2. The method as claimed in claim 1, including repeating steps (b) and (c) while drilling with said drilling motor.]

[3. The method as claimed in claim 1, wherein said second torque magnitude is substantially equal to said first torque magnitude.]

[4. The method as claimed in claim 1, wherein said second torque magnitude is less than said first torque magnitude.]

[5. The method as claimed in claim 1, wherein:

said drill string is rotated in said first direction to said first torque magnitude without changing said face angle; and, said drill string is rotated in said direction opposite said first direction to said second torque magnitude without changing said face angle.]

[6. The method as claimed in claim 5, wherein said second torque magnitude is substantially equal to said first torque magnitude.]

[7. The method as claimed in claim 5, wherein said second torque magnitude is less than said first torque magnitude.]

[8. The method as defined in claim 1 wherein said first torque magnitude is selected so that the drill string is rotated to a selected position therealong.]

[9. The method as defined in claim 8 wherein the selected position along the drill string is a position at which reactive torque from said drilling motor substantially is stopped by friction between the drill string and a wall of a wellbore.]

[10. A method of drilling a well, which comprises:

(a) determining the face angle of a downhole drilling motor, said downhole drilling motor being connected to a surface location by a drill string;

(b) rotating said drill string at said surface location in a first direction until a first measured torque magnitude is reached at said surface location without changing said face angle; and then (c) rotating said drill string in the direction opposite said first direction until a second measure torque magnitude is reached at said surface location without changing said face angle.]

[11. The method as claimed in claim 10, including repeating steps (a) and (b) while drilling with said drilling motor.]

[12. The method as claimed in claim 10, wherein said second torque magnitude is substantially equal to said first torque magnitude.]

[13. The method as claimed in claim 10, wherein said second torque magnitude is less than said first torque magnitude.]

[14. A directional drilling system, which comprises:

a torque sensor for determining torque applied to a drill string by rotating means;

a controller for operating said rotating means to rotate said drill string in a first direction until a first torque magnitude is determined and then in a direction opposite said first direction until a second torque magnitude is determined.]

[15. The system as claimed in claim 14, wherein said second torque magnitude is substantially equal to said first torque magnitude.]

[16. The system as claimed in claim 14, wherein said controller operates said rotating means to rotate said drill string until said first and second torque magnitudes are reached without changing bit face angle.]

[17. The system as claimed in claim 14 further comprising means for calculating a value of said first torque magnitude such that said drill string is rotated to a position along said drill string at which reactive torque from a drilling motor is stopped by friction between the drill string and a wall of a wellbore.]

[18. The system as claimed in claim 14, wherein said second torque magnitude is less than said first torque magnitude.]

[19. The system as claimed in claim 14, wherein said rotating means comprises a top drive.]

[20. The system as claimed in claim 14, wherein said rotating means comprises a rotary table.]

*21. A method of drilling a well, comprising:*

*(a) orienting a downhole drilling motor at a selected face angle, said drilling motor being connected by a drill string to a surface location;*

*(b) automatically rotating said drill string at said surface location in a first direction until a first measured torque magnitude is reached at the surface location; and then*

*(c) automatically changing rotation of said drill string to the direction opposite said first direction until a second measured torque magnitude is reached at the surface location; and then*

*(d) automatically changing rotation of said drill string to the first direction until the first measured torque magnitude is reached.*

*22. The method as claimed in claim 21, further comprising repeating (b), (c) and (d) while drilling the well with said drilling motor.*

*23. The method as claimed in claim 21, wherein said first measured torque magnitude corresponds to a change in the face angle.*

*24. The method as claimed in claim 21, wherein said second measured torque magnitude is less than said first measured torque magnitude.*

*25. The method as claimed in claim 21 further comprising:*

*(e) measuring said second torque magnitude at said surface location; and,*

*(f) automatically changing rotation of said drill string to the first direction when said second torque magnitude is substantially equal to said first torque magnitude.*

* * * * *